United States Patent Office
3,706,656
Patented Dec. 19, 1972

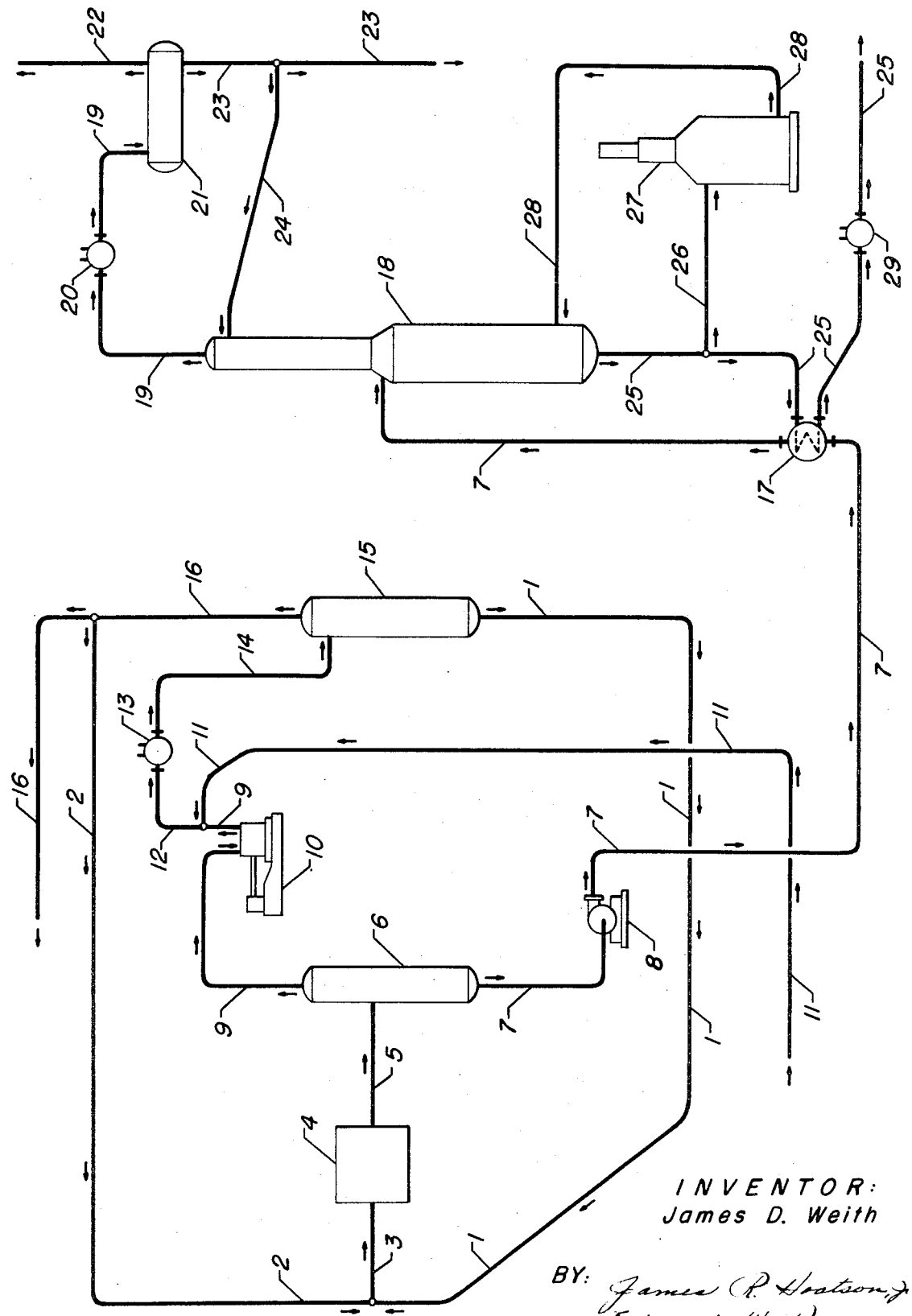

3,706,656
LPG AND HIGH PURITY HYDROGEN RECOVERY PROCESS
James D. Weith, Des Plaines, Ill., assignor to Universal Oil Products Company, Des Plaines, Ill.
Filed June 11, 1971, Ser. No. 152,327
Int. Cl. C10g 5/04, 35/08, 39/00
U.S. Cl. 208—82                                 9 Claims

ABSTRACT OF THE DISCLOSURE

Process for separating the effluent from a hydrocarbon conversion zone, i.e., reforming, by admixing fresh feed with a gaseous stream removed from a low pressure separator to produce a high purity hydrogen stream and maximize LPG recovery. The feedstock, containing absorbed hydrocarbons, is passed directly to the hydrocarbon conversion zone and the LPG is recovered from the low pressure separator liquid.

BACKGROUND OF THE INVENTION

The present invention relates to a hydrocarbon conversion process. More particularly, the present invention relates to the catalytic reforming of hydrocarbons to produce high quality gasoline boiling range products. Specifically, the present invention relates to separating the effluent from a catalytic reforming zone to produce a hydrogen stream suitable for recycle and to recover maximum amounts of liquefied petroleum gas.

It is well known to those trained in the refining art that high quality gasoline boiling range products, including aromatic hydrocarbons such as benzene, toluene and xylenes, may be produced by a catalytic reforming process wherein a naphtha feedstock is passed over a platinum containing catalyst in the presence of hydrogen, so as to convert at least a portion of the naphtha feedstock into aromatic hydrocarbons. One of the predominant reactions in a catalytic reforming reaction involves the dehydrogenation of naphthenic hydrocarbons. This results in a net excess of hydrogen being produced in the reforming process which is available for other refinery uses, such as hydrodesulfurization, hydrocracking and the like. Further, a considerable portion of the hydrogen produced in the reforming reaction is required for recycle purposes in order that a proper partial pressure of hydrogen be maintained over the platinum containing catalyst contained in the catalytic reforming zone. As a consequence, it is necessary to separate at least a portion of the hydrogen gas from the effluent from a catalytic reforming zone before the hydrogen can be utilized for recycle or other refinery purposes. Often, this function is performed in the prior art by flash separation of the catalytic reforming zone effluent or by performing a simple vapor liquid separation of the reforming zone effluent after the effluent has been cooled. In certain instances, a portion of the reformate product may be recycled to the separation zone wherein the hydrogen is separated from the reforming zone effluent to enhance the purity of the hydrogen recovered.

Another reaction which occurs in a catalytic reforming reaction is hydrocracking which segments hydrocarbons into relatively low molecular weight hydrocarbons such as normally gaseous hydrocarbons such as methane, ethane, propane, butane, isobutane and the like. In particular, $C_1^+$ hydrocarbons are contained in the effluent from the reforming reaction zone which, if continuously recycled with the gaseous hydrogen, would build up in the system and act as a contaminant. As a consequence, these hydrocarbons must be separated from the reforming zone effluent. These normally gaseous hydrocarbons, however, in spite of being a contaminant in the hydrogen recycle stream, have utility in and of themselves and it is desirable to recover these normally gaseous hydrocarbons in as high concentration as possible. In particular, the $C_3$ and $C_4$ hydrocarbons are useful as feedstock for alkylation reactions or for certain other reactions such as polymerization. Further, $C_3$ and $C_4$ hydrocarbons are also useful as liquefied petroleum gas (LPG) which find utilization as fuel in certain portions of the world. All of these normally gaseous hydrocarbons must, therefore, be separated from the effluent from a hydrocarbon conversion zone such as catalytic reforming, by various techniques known to the art, including absorption and fractionation so as to produce a residual reformate material of high quality gasoline boiling range hydrocarbons and a separate LPG product stream.

In addition to catalytic reforming, there are other hydrocarbon conversion processes which produce normally gaseous hydrocarbtons which are desirably recovered in varying amounts. For example, hydrocracking reactions, catalytic cracking reactions, thermal cracking reactions, hydrocarbon isomerizations, and the like, often produce commercially desirable quantities of these normally gaseous hydrocarbons. Therefore, it is desirable to provide efficient methods for separating the effluent from hydrocarbon conversion zones into the particular products desired, such as, for example, in catalytic reforming to separate the effluent into a hydrogen recycle stream, a normally gaseous hydrocarbon stream, an LPG stream, and a gasoline boiling range product, comprising normally liquid hydrocarbons.

SUMMARY OF THE INVENTION

Therefore, it is an object of the present invention to provide an improved method for the conversion of hydrocarbons and the recovery of high quality products from the resultant conversion product.

It is another object of this invention to provide an improved process for the catalytic reforming of hydrocarbons to produce a relatively high purity hydrogen recycle stream, a normally gaseous hydrocarbon product stream as a liquid stream and a gasoline boiling range product in a facile and economical manner.

It is a particular object of this invention to provide an improved process for separating the effluent from a hydrocarbon conversion zone, particularly a catalytic reforming zone, into normally gaseous hydrocarbon products, high purity hydrogen and normally liquid hydrocarbon products.

In an embodiment therefore, the present invention relates to a hydrocarbon conversion process for converting a normally liquid hydrocarbon feed, in admixture with hydrogen, in a hydrocarbon conversion zone to produce a conversion zone effluent comprising hydrogen, normally gaseous hydrocarbons and normally liquid hydrocarbons. The conversion zone effluent is separated in a low pressure separation zone to provide a gaseous hydrogen stream comprising hydrogen contaminated with hydrocarbons and a low pressure separator liquid stream containing normally liquid hydrocarbons and normally gaseous hydrocarbons. The gaseous hydrogen stream, preferably after it is compressed to a relatively high pressure, is contacted with at least a portion of the normally liquid hydrocarbon feed and the resultant mixture is separated, preferably at a relatively high pressure, to provide a hydrogen-rich gas stream and a liquid feed stream, containing normally gaseous hydrocarbons. The low pressure separator liquid stream is separated to provide an off gas stream comprising normally gaseous hydrocarbons, a liquid $C_3$ and $C_4$ hydrocarbon stream and a normally liquid hydrocarbon product stream. The liquid feed stream containing the normally gaseous hydrocarbon is then passed, without intervening separation, to the hydrocarbon conversion zone to serve as at least a portion of the hydrocarbon feed. Preferably, the high pressure separation zone, if utilized, is maintained at a pressure at least 50 p.s.i. higher than the pressure maintained on the low pressure separation zone. Further, it is preferred that the first gaseous stream be recycled to the hydrocarbon conversion zone.

In a further, more limited embodiment, the present invention relates to an improvement in a process for the catalytic reforming of a naphtha feed, in the presence of recycle hydrogen, in a naphtha reforming zone to produce high quality gasoline boiling range products and liquefied petroleum gas. The particular improvement involves introducing a hydrogen containing effluent from the reforming reaction zone into a first separation zone maintained under separation conditions including a temperature of about 60° F. to about 120° F. and a pressure relatively the same as the pressure maintained in the reforming reaction zone. This separation provides a first gaseous stream comprising hydrogen containing $C_1^+$ hydrocarbons and a first liquid stream containing high quality gasoline boiling range hydrocarbons, and $C_1^+$ hydrocarbons. The first gaseous stream is then compressed to a pressure at least 50 p.s.i. higher than the first separation zone pressure and the thus compressed gaseous stream is admixed with at least a portion of the naphtha feed. The resultant mixture is then separated in a second separation zone maintained under separation conditions including a temperature of about 60° F. to about 120° F. and a pressure at least 50 p.s.i. higher than the first separation zone pressure to provide an enriched hydrogen stream having a reduced $C_1^+$ hydrocarbon content, and a second liquid stream comprising feed naphtha containing $C_1^+$ hydrocarbons. At least a portion of the enriched hydrogen stream is then passed as recycle to the reforming zone and the second liquid stream is introduced into the reforming zone without intervening separation to provide at least a portion of the naphtha feed. The first liquid stream is introduced into a fractionation zone maintained under suitable fractionation conditions to provide an off gas stream comprising $C_1^+$ hydrocarbons, a first liquid product stream comprising $C_3$ and $C_4$ hydrocarbons (i.e., LPG), and a second liquid product stream comprising high quality gasoline boiling range hydrocarbons.

Thus, in essence, it can be seen that the present invention admixes the hydrocarbon feedstock to be passed to a hydrocarbon conversion zone with the gaseous effluent from a low pressure separation zone. This admixing effects an absorption of the normally gaseous hydrocarbons and produces an enriched hydrogen stream suitable for recycle. The rich hydrocarbon feed is passed directly to the reaction zone and the gaseous hydrocarbons contained therein are ultimately recovered in the low pressure separator liquid. The low pressure separator liquid, containing normally gaseous hydrocarbons produced by the conversion reaction, as well as those gaseous hydrocarbons previously produced but recycled back to the reaction zone in admixture with the fresh feed, is fractionated to produce a high recovery of normally gaseous hydrocarbons particularly as a liquid $C_3$–$C_4$ stream, as well as efficiently obtaining increased amounts of the desirable normally liquid hydrocarbon product.

DETAILED DESCRIPTION OF THE INVENTION

The broad art of hydrocarbon conversion and the specific art of catalytic reforming are generally well known to those trained in the art, and need not be discussed in great detail herein. For illustrative purposes, the process of the present invention will be described with reference to a catalytic reforming process since the inventive concept is particularly suitable for application therein, although it is to be clearly understood that the present invention provides a broad method for separating the effluent from any type of hydrocarbon conversion reaction zone which contains the type of components which are broadly referred to herein, as "normally gaseous hydrocarbons" and "normally liquid hydrocarbons" in admixture with hydrogen.

Suitable charge stocks for use in a catalytic reforming operation to produce a gasoline boiling range product, such as those previously mentioned reformates containing aromatic hydrocarbons, are those hydrocarbon feedstocks which contain both naphthenes and paraffins in relatively high concentration. Such hydrocarbon feedstocks include narrow boiling range fractions such as a naphtha fraction, as well as substantially pure materials such as cyclohexane, methylcyclohexane, methylcyclopentane and mixtures thereof. The preferred class of feedstocks suitable for a catalytic reforming operation include what is commonly known as straight run gasolines such as light and heavy naphtha fractions, with a naphtha fraction, relatively free of normally gaseous hydrocarbons and boiling between about 90° F. and 450° F. being the distinctly preferred feedstock for utilization in a catalytic reforming operation.

The preferred types of catalysts for use in a catalytic reforming process are well known to those skilled in the refining art and typically comprise platinum on an alumina support. These catalysts may contain substantial amounts of platinum but, for economic and quality reasons, the amount of platinum will be typically within the range of about 0.5% to about 5% by weight. Preferably, the reforming catalyst is promoted by another metallic component, such as rhenium, to form a bimetallic reforming catalyst which will lend stability to the reforming catalyst. Further, the preferred reforming catalyst may also be promoted with a halogen component to increase the acidity thereof.

Typical operating conditions for a catalytic reforming operation include the presence of the mentioned reforming catalyst and temperatures from about 500° F. to about 1050° F., preferably from about 600° F. to about 1000° F., pressures from about 50 p.s.i.g. to about 1200 p.s.i.g. preferably from about 100 p.s.i.g. to 300 p.s.i.g., a liquid hourly space velocity within the range of about 0.2 hr.$^{-1}$ to about 40 hr.$^{-1}$ and the presence of a hydrogen containing gas in an amount sufficient to provide a hydrogen to hydrocarbon mole ratio of about 0.5:1 to about 15:1.

Hydrocarbon conversion reactions utilizing a solid catalytic mass may be effected by containing the catalyst in a fixed bed or series of fixed beds, a moving bed or a fluidized bed, by techniques well known to those skilled in the hydrocarbon conversion art. A catalytic reforming operation is often carried out, in a fixed bed configuration, usually employing a plurality of catalyst beds utilized in either a stacked fashion with a single reactor shell or a separate series of reactors. In particular, according to the hydrocarbon conversion practice of the present invention, anywhere from 2 to 5 separate catalyst beds are maintained in separate reactor vessels, with 3 or 4 separate reactor beds being typically utilized in a naphtha reforming operation.

The exact amount of catalyst to be utilized in each reactor bed can be varied depending upon the characteristics of the feedstock and the particular purpose for which the hydrocarbon conversion reaction is being carried out. In catalytic reforming, for example, when 4 separate reactors are being utilized, the catalyst may be disposed in separate reactors in the following manner: 10%, 15%, 25% and 50% by weight catalyst in each of the reactors respectively. Other variations, including reactor geometry and catalyst volume, are self-evident to those skilled in the refining art from their general knowledge and the specific teachings presented herein.

The unique feature of the present invention may be best understood by a comparison with a prior art scheme commonly utilized. This prior art sequence separates the hydrogen containing effluent from a catalytic reforming reactor, after cooling, in a low pressure separator maintained at a pressure substantially the same as the reforming reactor from which the effluent emanates. In a typical reforming operation the pressure differential is usually less than 50 p.s.i. Therefore, as utilized herein, both in reference to the prior art and the present invention, "substantially the same pressure" indicates the pressure of the reforming reaction zone less only the pressure drop due to normal flow through the system. Also, as is well known to those trained in the art, reforming encompasses a wide pressure range and includes what is known as "low pressure" and "high pressure" reforming. Therefore, for "low pressure" reforming, the low pressure separator will be maintained at a pressure within the range of about 50 p.s.i.g. to about 200 p.s.i.g. whereas for "high pressure" reforming, the low pressure separator will be maintained at a pressure of about 200 p.s.i.g. to about 350 p.s.i.g.

A hydrogen containing gas stream is recovered from the low pressure separator and compressed to a pressure at least 50 p.s.i. higher than the low pressure separator and re-mixed with the liquid recovered from the low pressure separator. The resultant mixture is again separated in a high pressure separator to produce a hydrogen containing gas stream of higher purity than produced in the low pressure separator. In other words, the compression and separation at the higher pressure results in the liquid absorbing greater amounts of normally gaseous hydrocarbons. Not infrequently, a portion of the converted products are passed to at least one of the separators to help purify the hydrogen recovered.

In the present invention, the gaseous effluent from the low pressure separation zone is not admixed with the liquid obtained from the low pressure separation, but rather is admixed with at least a portion of the fresh hydrocarbon feed. Since the fresh feed is a normally liquid hydrocarbon relatively free of normally gaseous hydrocarbons (i.e., $C_1$–$C_4$ hydrocarbons), it has a greater absorptive capacity than the low pressure separator liquid. More particularly, when the liquid hydrocarbon feed is a naphtha fraction to be reformed, the feed, because it contains a higher concentration of paraffins and naphthenes than the reformate product, has a greater absorptive capacity for normally gaseous hydrocarbon than the more aromatic rich product. Hence, a fresh naphtha feed is capable of producing a richer hydrogen stream and recovering larger amounts of LPG than is a reformate product or a portion thereof.

The contacting of the vapor stream and the separation of the resultant mixture may be effected by the utilization of a conventional countercurrent absorption column. However, particularly when the ratio of vapor to liquid is relatively high, i.e., greater than about 2:1 such as would occur in a catalytic reforming zone, the contacting is preferably effected by simply commingling the vapor stream and the fresh feed naphtha, i.e., by inline mixing techniques, and separating the resultant mixture at a relatively high pressure.

While the contacting of the low pressure separator vapor stream with the fresh feed naphtha and the subsequent separation may be effected at substantially the same pressure as the pressure of the low pressure separation zone, it is preferred that the low pressure separator vapor be first compressed to a relatively high pressure before it is contacted with the naphtha. The subsequent separation is also effected at the relatively high pressure.

As utilized herein, the terms "relatively high pressure" and "high pressure separation zone" and the like are intended to connote a pressure at least 50 p.s.i. higher than the previously discussed low pressure separation. Preferably, the high presure is at least 100 p.s.i. higer than the low pressure. Accordingly, high pressure is a relative term, indicative of a difference in pressure between two zones and is not indicative of an absolute pressure. More particularly, in a reforming embodiment, when the low pressure separator is operated at a pressure of about 50–200 p.s.i.g. (i.e., "low pressure reforming"), the second separation zone is maintained under a pressure in the range of about 100 p.s.i.g. to about 300 p.s.i.g. Similarly, when the low pressure separator is operated in the range of 200 p.s.i.g. to about 350 p.s.i.g. (i.e., "high pressure reforming"), the second separation zone is operated at a pressure in the range of about 250 p.s.i.g. to about 500 p.s.i.g. In any event, it is preferred that both the low pressure and high pressure separation zones be maintained at a temperature of about 60° F. to about 120° F.

From the foregoing, it is seen that when a normally liquid hydrocarbon feed is contacted with a gaseous stream, obtained from a low pressure separator, preferably after compression, containing hydrogen contaminated wtih hydrocarbons, particularly $C_1^+$ hydrocarbon, and subsequently separated, there is provided an enriched hydrogen stream having a reduced hydrocarbon content and the $C_1^+$ hydrocarbons removed therefrom, including the normally gaseous hydrocarbons, are absorbed in the liquid feed hydrocarbon. Preferably, at least a portion of the enriched hydrogen is recycled back to the hydrocarbon conversion zone such as a catalytic reformer. By utilizing the described mode of operation, a hydrogen purity of at least 80 mole percent is obtainable in a reforming operation.

The fresh liquid hydrocarbon feed containing the absorbed gaseous hydrocarbons is passed directly to the hydrocarbon conversion zone without intervening removal of the absorbed normally gaseous hydrocarbons. The absorbed hydrocarbons are generally "untouched" in the conversion zone, and will be contained in the liquid recovered from the low pressure separator. To complete the recovery of normally gaseous hydrocarbons, particularly as liquefied petroleum gas (LPG) from the hydrocarbon conversion effluent, this liquid stream provided by the low pressure separator is separated into a gaseous off stream comprising normally gaseous hydrocarbons, a liquid $C_3$–$C_4$ hydrocarbon stream, and a normally liquid hydrocarbon stream. Typically, this liquid stream will also contain minor amounts of hydrogen which will be contained in the gaseous off stream after separation. This separation may be effected by introducing that liquid stream into a fractionation zone maintained under suitable fractionation conditions well known to those trained in the art. In a catalytic reforming embodiment, such a fractionation zone is commonly referred to in the art as a debutanizer or a product stabilizer and, for illustrative purposes, is maintained under overhead and bottoms temperature of about 180–200° F. and 450–500° F., respectively in conjunction with an overhead pressure of about 250–300 p.s.i.g.

Operating a hydrocarbon conversion zone in the indicated manner will produce relatively high purity hydrogen suitable for recycle purposes as well as being suitable for use in other refinery processes and will maximize LPG recovery from the conversion zone effluent.

DESCRIPTION OF THE DRAWING

The process of the present invention can be most clearly described and illustrated by reference to the attached drawing, schematically illustrating the production of high octane motor fuel and LPG by the catalytic reforming of a hydrotreated, straight run, depentanized naphtha fraction. Of necessity certain limitations must be present in a schematic diagram of the type presented and no intention is made thereby to limit the generally broad scope of this invention to specific feedstocks, flow rates, operating conditions, catalysts, etc. Miscellaneous appurtenances including valves, controls, pumps, compressors, separators, reboilers, etc., have been eliminated and only those vessels and lines necessary for a complete and clear understanding of the various embodiments of this invention are illustrated. Obvious modifications to the process flow made by those possessing expertise in petroleum technology, particularly the art of catalytic reforming and product recovery, are all included within the broad scope of the claimed invention.

Referring now to the attached schematic flow diagram, a depentanized naphtha fraction obtained from a petroleum crude source which has been desulfurized and is relatively free of $C_5^-$ hydrocarbons, enters the process of this invention via line 11. Before this feedstock is passed to the reforming reactor section 4, it is first utilized to purify the hydrogen produced in reactor section 4 and to maximize the recovery of LPG therefrom by means to be described later.

In any event, feed naphtha recovered in a manner to be described later, and containing absorbed normally gaseous hydrocarbons is passed to reactor section 4 via line 1 and commingled with recycle hydrogen entering in line 2, and the resultant mixture passed via line 3 to reforming reactor section 4. This reactor section is a conventional platinum catalyst reforming reactor operated to produce high quality gasoline boiling range hydrocarbons from the feed naphtha. The effluent from reactor section 4 emanates via line 5 and comprises hydrogen, normally gaseous hydrocarbons and normally liquid hydrocarbons including high quality gasoline boiling range products. This effluent, which leaves reaction section 4 at an elevated temperature and a pressure of about 300 p.s.i.g., is cooled by means not shown and passed to low pressure separator 6. Low pressure separator 6 is maintained at a temperature of about 100° F. and a pressure of 270 p.s.i.g. This pressure differential between separator 6 and reactor section 4 is due solely to flow losses in line 5. Removed from low pressure separator 6 via line 7 is a liquid stream comprising normally liquid hydrocarbons, residual amounts of hydrogen and normally gaseous hydrocarbons. Removed overhead from low pressure separator 6 via line 9 is a vaporous fraction comprising hydrogen, normally gaseous hydrocarbons and a minor amount of normally liquid hydrocarbons. This gaseous stream is compressed, by compressor means 10, to a pressure of about 375 p.s.i.g. and removed via line 9 and commingled with the described fresh feed naphtha entering via line 11. The resultant mixture is passed via line 12 and is cooled back to a temperature of 100° F. in heat exchange means 13, to remove the heat induced by compression of vapor stream 9, and this cooled mixture is then passed via line 14 to high pressure separator 15.

In high pressure separator 15, which is also maintained at a pressure of about 370 p.s.i.g., the mixture formed in line 14 by admixing the fresh feed naphtha with the low pressure separator vapors, is again separated and a vapor fraction removed therefrom via line 16. The vapor contained in line 16 contains hydrogen of greater purity than the hydrogen in line 9 and comprises, in addition to hydrogen, a lesser amount of normally gaseous hydrocarbons and liquid hydrocarbons than contained in line 9. A portion of the thus enriched hydrogen stream is passed via line 2, as the previously described hydrogen recycle, with the remaining hydrogen, which represents the net hydrogen production in reactor section 4, removed via line 16 for uses in other refinery units, such as hydrocracking or desulfurization.

Removed as a rich liquid from the bottom portion of high pressure separator 15 is a liquid stream comprising the fresh feed naphtha containing absorbed amounts of normally gaseous hydrocarbons. This rich oil stream is passed via line 1 to reactor section 4. In the reforming environment of reactor section 4, the normally gaseous hydrocarbons merely pass through the reactor section and at least a portion thereof are ultimately absorbed in the liquid removed from low pressure separator via line 7.

Referring back to the liquid removed from low pressure separator 6, this stream is pumped via pumping means 8 through line 7 and is heated by indirect heat exchange in heat exchange means 17 with stabilizer bottoms 25, the source of which is to be described later. The thus heated, low pressure separator liquid is passed to stabilizer column 18, wherein normally gaseous hydrocarbons are separated from the high quality gasoline boiling range products produced in reactor section 4. More specifically, stabilizer 18 is a conventional fractionation zone of a type well known to those trained in the art, and often referred to as a debutanizer. The heat needed for stabilizer 18 is provided by with drawing a bottoms fraction via line 25 and passing a portion thereof via line 26 to heater 27. The thus heated liquid is then passed via line 28 back to stabilizer 18 and supplies the heat necessary to effect a fractional distillation separation in stabilizer 18. The remaining portion of the liquid, removed from the bottom portion of stabilizer 18, is passed via line 25 to heat exchange means 17 to supply part of the necessary heat to operate stabilizer 18 and is then passed to heat exchange means 29. This liquid which represents a $C_5^+$ stabilized reformate comprising high quality gasoline boiling range hydrocarbons, is further cooled in heat exchange means 29 and leaves the process of this invention via line 25.

Removed overhead from stabilizer 18 via line 19, is a vapor fraction comprising the residual amounts of hydrogen and normally gaseous hydrocarbons contained in the liquid effluent from low pressure separator 6. This vapor is passed to condensing means 20 to effect a condensation of the $C_3$ and $C_4$ hydrocarbons. The resultant two-phase mixture is removed via line 19 and passed to accumulator-separator 21 wherein an off-gas stream is removed via line 22 which comprises hydrogen, methane and ethane. This stream is suitable for use as fuel in other parts of a refinery operation. A liquid stream comprising LPG is removed from separator 21 via line 23 and a portion thereof removed via line 24 and passed as reflux to the upper portion of stabilizer 18. The remaining portion of the liquid is withdrawn via line 23 and represents the net product stream of liquefied petroleum gas (LPG).

Referring to the following illustrative embodiment which illustrates the compositions of the various streams referred to in the foregoing section of the drawing, the benefits obtained by contacting fresh feed naphtha with the low pressure separator vapor will be obvious to those trained in the art in that it will be more apparent that a high purity hydrogen is produced and the recovery of LPG maximized. All compositons are presented as moles per hour.

| | Streams | | | | |
|---|---|---|---|---|---|
| | 5 | 7 | 9 | 16 | 1 |
| Component: | | | | | |
| H₂ | 9,858.00 | 10.08 | 9,847.92 | 9,827.23 | 20.68 |
| C₁ | 1,432.49 | 11.79 | 1,420.71 | 1,396.71 | 23.99 |
| C₂ | 836.87 | 30.05 | 806.82 | 750.23 | 56.59 |
| C₃ | 571.15 | 64.86 | 506.29 | 407.26 | 99.03 |
| iC₄ | 146.58 | 33.07 | 113.52 | 73.97 | 39.54 |
| nC₄ | 186.79 | 53.50 | 133.29 | 76.99 | 56.30 |
| iC₅ | 110.53 | 53.33 | 57.20 | 21.56 | 35.64 |
| nC₅ | 66.11 | 36.12 | 29.99 | 9.57 | 20.42 |
| C₆+ | 1,165.06 | 1,069.02 | 96.06 | 50.52 | 1,286.46 |
| Total | 14,373.58 | 1,361.82 | 13,011.80 | 12,614.04 | 1,638.65 |

I claim as my invention:

1. A hydrocarbon conversion process which comprises the steps of:
   (a) converting a normally liquid hydrocarbon in admixture with hydrogen, in a hydrocarbon conversion zone to provide a conversion zone effluent comprising hydrogen, normally gaseous hydrocarbons and normally liquid hydrocarbons;
   (b) separating the conversion zone effluent in a low pressure separation zone to provide a gaseous hydrogen stream comprising hydrogen contaminated with hydrocarbons and a low pressure separation liquid stream comprising normally gaseous and normally liquid hydrocarbons;

(c) contacting the gaseous hydrogen stream with at least a portion of the normally liquid hydrocarbon feed and separating the resultant mixture to provide a hydrogen enriched gas stream and a liquid feed stream containing normally gaseous hydrocarbons;

(d) passing the liquid feed stream of step (c) to the hydrocarbon conversion zone to provide at least a portion of the normally liquid hydrocarbon passed to the conversion zone; and (e) separating the low pressure separator liquid to provide an off-gas stream comprising normally gaseous hydrocarbons, a liquid $C_3$–$C_4$ hydrocarbon product stream, and a normally liquid hydrocarbon product stream.

2. The process of claim 1 wherein the first gaseous stream is compressed prior to contacting with the hydrocarbon feed and the resultant mixture is separated at a relatively high pressure, in a high pressure separation zone.

3. The process of claim 2 wherein the high pressure separation zone is at least 50 p.s.i. higher than the low pressure separation zone.

4. The process of claim 1 wherein at least a portion of the hydrogen enriched gaseous stream is recycled to the hydrocarbon conversion zone.

5. The process of claim 1 wherein the conversion zone comprises a catalytic reforming zone utilizing a platinum containing catalyst maintained under conditions sufficient to convert hydrocarbons to aromatic containing, gasoline boiling range conversion products.

6. The process of claim 5 wherein the hydrocarbon converted comprises a naphtha fraction.

7. In a process for the catalytic reforming of a naphtha feed in the presence of recycle hydrogen in a naphtha reforming zone to produce high quality gasoline boiling range products and liquefied petroleum gas, the improvement which comprises the steps of:

(a) introducing a hydrogen containing effluent from a reforming reaction zone into a first separation zone maintained under separation conditions including a temperature of about 60° F. to about 120° F. and a pressure relatively the same as the reforming reaction zone to provide a first gaseous stream comprising hydrogen containing $C_1^+$ hydrocarbons and a first liquid stream containing high quality, gasoline boiling range hydrocarbons and $C_1^+$ hydrocarbons;

(b) compressing the first gaseous stream to a pressure at least 50 p.s.i. higher than the first separation zone pressure;

(c) admixing the compressed gaseous stream with at least a portion of the naphtha feed and separating the resultant mixture in a second separation zone maintained under separation conditions including a temperature of about 60° F. to about 120° F. and a pressure at least 50 p.s.i. higher than the first separation zone pressure to provide an enriched hydrogen stream having a reduced $C_1^+$ hydrocarbon content and a second liquid stream comprising feed naphtha containing $C_1^+$ hydrocarbons;

(d) passing at least a portion of the enriched hydrogen stream, as recycle, to the reforming zone;

(e) passing the naphtha feed containing $C_1^+$ hydrocarbons to the reforming zone; and, (f) introducing the first liquid stream into a fractionation zone maintained under fractionation conditions to provide an off gas stream comprising $C_1^+$ hydrocarbons, a first liquid product stream comprising $C_3$ and $C_4$ hydrocarbons, and a second liquid product stream comprising high quality gasoline boiling range hydrocarbons.

8. The improvement of claim 7 wherein the first separation zone is maintained under a pressure in the range of about 50 p.s.i.g. to about 200 p.s.i.g. and the second separation zone is maintained under a pressure in the range of about 100 p.s.i.g. to about 300 p.s.i.g.

9. The improvement of claim 7 wherein the first separation zone is maintained under a pressure in the range of about 200 p.s.i.g. to about 350 p.s.i.g. and the second separation zone is maintained under a pressure in the range of about 250 p.s.i.g. to about 500 p.s.i.g.

References Cited

UNITED STATES PATENTS

| | | | |
|---|---|---|---|
| 3,044,952 | 7/1962 | Baumann et al. | 208—82 |
| 3,133,875 | 5/1964 | Hirschbeck et al. | 208—82 |
| 3,445,379 | 5/1969 | Hansen | 208—107 |
| 3,520,799 | 7/1970 | Forbes | 208—101 |
| 3,520,800 | 7/1970 | Forbes | 208—101 |
| 3,537,978 | 11/1970 | Borst | 208—101 |

DELBERT E. GANTZ, Primary Examiner

G. E. SCHMITKONS, Assistant Examiner

U.S. Cl. X.R.

208—81, 101, 138